(12) United States Patent
Ouviev (10) Patent No.: US 8,568,130 B2
(45) Date of Patent: Oct. 29, 2013

(54) CASTING MACHINE AND CASTING MACHINE VALVE

(75) Inventor: Boris Ouviev, Niederuzwil (CH)

(73) Assignee: Bühler AG, Uzwil (CH)

( * ) Notice: Subject to any disclaimer, the term of this patent is extended or adjusted under 35 U.S.C. 154(b) by 323 days.

(21) Appl. No.: 12/988,559

(22) PCT Filed: Apr. 20, 2009

(86) PCT No.: PCT/EP2009/054647
§ 371 (c)(1),
(2), (4) Date: Oct. 28, 2010

(87) PCT Pub. No.: WO2009/130178
PCT Pub. Date: Oct. 29, 2009

(65) Prior Publication Data
US 2011/0036432 A1    Feb. 17, 2011

(30) Foreign Application Priority Data

Apr. 22, 2008  (DE) .......................... 10 2008 001 323

(51) Int. Cl.
*A23G 1/21* (2006.01)
(52) U.S. Cl.
USPC ........... 425/449; 137/849; 222/490; 222/494; 222/511
(58) Field of Classification Search
USPC ........... 137/849; 222/490, 494, 511; 425/449
See application file for complete search history.

(56) References Cited

U.S. PATENT DOCUMENTS

| | | | | | |
|---|---|---|---|---|---|
| 2,524,764 | A | * | 10/1950 | Burke | 137/217 |
| 3,211,340 | A | * | 10/1965 | Zander et al. | 222/95 |
| 3,258,175 | A | * | 6/1966 | Taylor | 222/380 |
| 3,342,318 | A | * | 9/1967 | Ruekberg et al. | 206/540 |
| 3,807,444 | A | * | 4/1974 | Fortune | 137/512.1 |
| 4,762,308 | A | * | 8/1988 | Geno | 267/64.27 |

(Continued)

FOREIGN PATENT DOCUMENTS

| | | |
|---|---|---|
| DE | 29905283 | 6/1999 |
| DE | 102006004690 | 8/2007 |

(Continued)

*Primary Examiner* — Robert B Davis
(74) *Attorney, Agent, or Firm* — Shoemaker and Mattare (57) ABSTRACT

The invention relates to a casting machine (1) for casting a flowable mass (M), in particular a flowable mass with suspended solid particles. Said casting machine comprises a mass container (2) for receiving the flowable mass and at least one valve (32; 42; 50; 60; 70; 80; 90; 100; 110; 120) that is fluidically connected to the inner area of the mass container. When the pressure changes in the direction of the valve along the valve passage, said valve is in the open state and in the absence of a pressure change in the direction of the valve passage, said valve is in the closed state. The casting machine also comprises pressure generating means (3, 4, 5, 6, 32, 42) for generating a change in the pressure in the direction of the valve passage. Said valve (50; 60; 70; 80; 90; 100; 110; 120) comprises a valve body (51; 61; 71; 81; 91; 101; 111; 121) comprising a valve opening and at least one valve cover (53; 64; 76; 83; 94; 105; 115; 128) that is oriented towards the valve opening, articulated on the valve body and is subjected to an elastic prestressing that presses the valve cover against the valve opening and seals it. The invention also relates to a valve (50; 60; 70; 80; 90; 100; 110; 120) and to pressure generating means (3, 4, 5, 6, 32, 42) that are suitable for the modular construction of the claimed casting machine (1).

19 Claims, 10 Drawing Sheets

(56) References Cited

U.S. PATENT DOCUMENTS

| | | | | |
|---|---|---|---|---|
| 4,877,160 A | * | 10/1989 | Derving | 222/494 |
| 6,035,896 A | * | 3/2000 | Liardet | 137/849 |
| 6,199,725 B1 | * | 3/2001 | Garibaldi | 222/207 |

FOREIGN PATENT DOCUMENTS

| | | |
|---|---|---|
| EP | 0610724 | 8/1994 |
| JP | 54-89077 A | 7/1979 |
| JP | 57-177472 A | 11/1982 |
| JP | 2-233302 A | 9/1990 |
| JP | 3-38701 U | 4/1991 |
| JP | 8-334091 A | 12/1996 |
| JP | 2007-153354 A | 6/2007 |
| WO | 95/21531 A1 | 8/1995 |
| WO | 01/78966 | 10/2001 |
| WO | 2008/141468 | 11/2008 |

\* cited by examiner

CASTING MACHINE AND CASTING MACHINE VALVE

The invention relates to a casting machine for casting a flowable mass, in particular a liquid mass with suspended solid particles, such as chocolate for example, in which typically cocoa particles and sugar particles are suspended in a molten fatty mass comprising cocoa butter and to a greater or lesser extent milk fat.

The invention also relates to a valve and a pressure generating means, which may be installed in the casting machine according to the invention.

Known casting machines of this type for casting chocolate include, for example, a mass container for receiving the flowable mass; at least one valve, which is fluidically connected to the interior space of the mass container, the valve being in an open state in the presence of a pressure gradient along the flowing-through direction of said valve and in a closed state in the absence of this pressure gradient along the flowing-through direction of said valve; and a pressure generating means for generating a pressure gradient along the flowing-through direction of the valve.

In practice, the component parts of such casting machines are composed of rigid metal parts. The mass container serves for receiving the castable mass. Leading away from its base are lines, which respectively open out into one of a multiplicity of chambers, in each of which a piston can be moved. Each of the chambers is respectively connected at the other end to a nozzle. A valve function is provided for each chamber/piston/nozzle unit.

In an intake stroke, the respective valve opens the respective connecting line between the mass container and the respective chamber, while the respective connecting line between the respective chamber and the respective nozzle is blocked. The respective piston then moves in the chamber in such a way that the free chamber volume is increased and mass is sucked into the respective chamber.

In a discharge stroke, the respective valve closes the respective connecting line between the mass container and the respective chamber, while the respective connecting line between the respective chamber and the respective nozzle is opened. The respective piston then moves in the chamber in such a way that the free chamber volume is decreased and mass is pumped out of the respective chamber and to the respective nozzle.

The mass emerging from the nozzle is then forced or poured onto an underlying surface or into a hollow mold.

In the case of some particular forms of construction of casting machines of this type, the valve function is coupled with the piston function. For this purpose, the piston is formed, for example, as an essentially cylindrical reciprocating/rotary piston, which, in a cylinder chamber, can on the one hand perform a reciprocating movement along the axis of the chamber or of the piston and on the other hand can perform a rotary movement about the axis of the chamber or of the piston. A special arrangement of the mouths of the connecting lines in the respective chamber wall and corresponding clearances and/or passages in the respective piston allows a complete casting cycle (intake+discharge) to be carried out by a succession of reciprocating and rotating movements of the respective piston in a first direction and in an opposing, second direction.

Even if the number of movable parts could be reduced somewhat in the last-mentioned more compact forms of construction of casting machines of this type by combining the piston function and the valve function, such conventional casting machines still have a large number of movable parts.

In addition, in many cases when casting masses of low viscosity, continued flowing from the nozzle cannot be prevented at the end of the discharge stroke. In the case of most applications in which chocolate mass is cast, the casting takes place at such high temperatures that at least the crystal modifications of the triglycerides, which melt at relatively low temperatures, are melted, with the result that the chocolate mass as a whole is in a state of quite low viscosity and continued flowing takes place at the nozzles.

Since generally small amounts are cast per casting cycle, virtually the entire casting operation takes place in the transient (non-steady-state) mode. Apart from the aforementioned continued flowing and the metering deviations which are at least to some extent caused by this, the casting, which predominantly takes place in the transient range, also leads to structural changes in the mass. This can lead to adverse effects on the quality of the cast chocolate masses.

Furthermore, given predefined production capacities (cycle frequency and metered amount per cycle), it is virtually impossible to influence the variation over time of the flow resistance that is dependent on the flow properties (viscosity) of chocolate mass to be cast and the geometrical boundary conditions.

The pressure difference present at the nozzle must be sufficiently large to overcome the flow limit of the chocolate mass to be cast at the beginning of casting. This means that this pressure difference increases strongly at first. As soon as the flowing begins, a much lower pressure difference is required to maintain further constant flowing. In addition, owing to the laminar shearing flow which now flows with a parabolic flow profile, there is a change in the flow properties (viscosity) of the chocolate mass, with the effect that the viscosity decreases. The shearing therefore has a viscosity-reducing effect here. The pressure difference required at the beginning to overcome the flow limit of the chocolate mass is therefore much greater than the pressure difference required to maintain the flow after flowing has begun. However, the design of the pressure sources and the stability of many machine parts have to be based on this maximum pressure requirement.

The invention is therefore based on the object of providing a casting machine for producing an edible product from a castable mass, in particular from a fatty mass such as chocolate for example, in which the described disadvantages and inadequacies during casting can be avoided, or at least reduced. At the same time, it is intended that the casting machine should have a simple structure which is not susceptible to faults.

Casting Machine

This object is achieved by the invention in that, in the case of the casting machine described at the beginning, the valve has a valve body with a valve opening and at least one valve flap assigned to the valve opening, which flap is articulated on the valve body and is subjected to an elastic prestressing which presses the valve flap against the valve opening and seals it.

The elastic prestressing of the valve flap in its closed state, in which it lies against the valve body and presses against the valve opening, prevents mass from emerging through the valve in an uncontrolled manner, i.e. without a defined pressure difference at the valve, and in particular prevents mass from continuing to flow at the end of a casting operation.

When the pressure difference generated at the valve, preferably built up in a defined way, is great enough to overcome the elastic prestressing of the sealing valve flap and the flow limit of the mass to be forced through the valve opening, the mass begins to flow through the valve opening, the valve flap being moved against the elastic prestressing and increasing the flow cross section of the valve. During the casting operation, a momentary or steady-state equilibrium is thereby established between the elastic restoring force (closing force) of the valve flap and the deflecting force (opening force) of the valve flap generated by the pressure difference in the flowing mass. The "yielding" valve has the effect of preventing, or at least significantly keeping down, the momentary transient pressure peaks of the pressure difference present at the valve as compared to a rigid valve.

Valve

The valve according to the invention is suitable for installation in the casting machine described above. It has a valve body with a valve opening and at least one valve flap assigned to the valve opening, which flap is articulated on the valve body and is subjected to an elastic prestressing which presses the valve flap against the valve opening and seals it.

The valve flap is preferably flexible. For this purpose, it consists of a sufficiently soft-elastic material and/or is sufficiently small along one dimension, i.e. has a small flap thickness. It is particularly advantageous if the valve flap consists of elastomer material which lies against the valve opening in the prestressed state. As a result, a good closing action of the valve can be achieved.

To improve the symmetry of the flow through the valve, at least two valve flaps assigned to the valve opening may be provided, which valve flaps are articulated on the valve body and are each subjected to an elastic prestressing which presses the valve flaps against one another and seals the valve opening. Furthermore, the contribution to the opening of the valve is then shared between two valve flaps, which has the consequence that the deflecting and/or deforming of each one of the valve flaps is less. The material in the articulating region of the valve flaps on the valve body or the material of the valve flaps themselves is stressed to a lesser extent as a result, whereby the lifetime of the valves can be increased.

The valve flap according to the invention preferably has such a geometry that the flap edge of the at least one valve flap of the valve, projected perpendicularly to the flowing-through direction of the valve onto a valve cross-sectional plane, extends from a first radially outer point of the valve cross-sectional plane over a radially central point of the valve cross-sectional plane to a second radially outer point of the valve cross-sectional plane. This angular or curved profile makes it possible to increase the pressing force of the valve flap or the flap edge against the valve opening or the opening edge, in that a radially inwardly directed force is made to act on the valve flap from each of the two radially outer points of the cross-sectional plane in the articulating region.

It is advantageous if the valve has at least three valve flaps assigned to the valve opening, which valve flaps are articulated on the valve body in a peripheral region and are each subjected to an elastic prestressing which presses the valve flaps against one another and seals the valve opening, the valve having a pyramidal shape which is elevated in the direction of the flowing-through direction of the valve and the pyramidal faces of which are respectively formed by a valve flap, with the result that between two respective pyramidal faces adjacent to one another a valve slit respectively extends from a radially outer point to the radial center. This shape of the valve that is elevated in the flowing-through direction increases its ability to withstand flipping over of the valve in the closed state if the fluid pressure downstream in the flowing-through direction of the valve is greater than the fluid pressure upstream in the flowing-through direction of the valve. On the other hand, only a relatively small deformation is required for each of the plurality of valve flaps to bring about a sufficient opening of the valve. A valve of this type may have three, four, five or six valve flaps and have a respectively three-, four-, five- or six-faced pyramidal shape.

In the case of a particularly advantageous embodiment, the pyramidal faces, seen from the tip of the pyramid, are each concavely shaped and formed by a respective concavely shaped valve flap, the concavity of which extends between the delimiting valve slits of the flap and the peripheral articulating region of the flap. These concave valve flaps form in their totality a multisided pyramid, the side faces of which, from a downstream perspective, are respectively formed as a concave facet. This contributes to the improved closing action, i.e. a more stable closed state of the valve.

The valve body and the at least one valve flap may be formed in one piece. They are preferably formed as a one-piece elastomer molding. This allows the valve according to the invention to be produced in a molding operation, if appropriate with subsequent crosslinking, for example vulcanization.

Alternatively, the valve body and the at least one valve flap may be connected to one another by a form-locking and/or force-locking plug-in connection. It is in this case advantageous if the valve body and/or the valve flap(s) consist(s) of flexible material. The degree of flexibility of the valve may be fixed by the modulus of elasticity and/or by the dimensions orthogonally to the bending line or bending plane of the portions of the valve or component parts of the valve, an increase in the modulus of elasticity or an increase in the dimensioning reducing the flexibility and, conversely, a decrease in the modulus of elasticity or a decrease in the dimensioning increasing the flexibility. The valve body and/or the at least one valve flap may also be coupled with a stabilizing element or stiffening element. The stabilizing element or stiffening element expediency consists of a first material and the valve or the valve body and/or the at least one valve expediently consists of a second material, the modulus of elasticity of the first material being greater than the modulus of elasticity of the second material.

In the case of a preferred embodiment, the valve body is arranged in a valve seat which surrounds it in the manner of a ring and consists of the first material. The valve body, and if applicable the valve flaps, preferably consist of a soft-elastic material, while the ring-like valve seat consists of a hard-elastic material.

All the measures for stiffening or stabilizing the valve as a whole or the portions or component parts thereof should in this case be arranged inside a soft-elastic material or act on the valve from the valve seat, with the result that it is ensured that the regions of the valve which come into contact with one another during the closing of the valve, for example valve slits, can undergo the necessary deformation. The regions of the valve which come into contact with one another therefore form sealing regions or the actual valve seal.

In the case of a further embodiment, on account of the deformation of the valve, during the transition from the closed state to the open state of the valve or during the transition from the open state to the closed state of the valve, the at least one valve passes through a pressure point at which the potential energy stored in the valve is at a maximum. The pressure point may be brought about, for example, by the valve undergoing during its bending from the closed state to the open state a compression along the bending line or bending plane that initially increases and, after overcoming the pressure point, decreases. The maximum potential energy is then primarily in the form of compression energy. The deformation of the valve may be, for example, an eversion of a valve flap from a concave form of the valve flap to a convex form of the valve flap.

Pressure Generating Means

The pressure generating means is suitable for installation in the casting machine described further above. It has a metering chamber with variable chamber volume and with at least one metering chamber outlet valve and one metering chamber inlet valve, the metering chamber inlet valve being arranged in the fluidic connection between the mass container volume and the metering chamber volume.

The pressure generating means represents a pump, the operating mode of which has an intake stroke and a discharge stroke.

The metering chamber with variable chamber volume, the metering chamber outlet valve and the metering chamber inlet valve together form a metering unit. During an intake stroke, mass passes via the open inlet valve into the metering chamber with the outlet valve closed, and during a discharge stroke mass passes via the open outlet valve out of the metering chamber with the inlet valve closed, in order for example to be poured into hollow molds, into cells or onto a conveyor belt.

The pressure generating means may have a mass container which can be hermetically sealed and communicates with a pressure source. This allows the filling of the metering chamber with mass (metering in) to be performed, or at least assisted, by application of pressure to the mass in the mass container. A source of compressed gas, in particular a compressed air source, may be used as the pressure source. Instead of the pressure source or in addition to it, the pressure generating means may have a hermetically sealable mass container with variable mass container volume. This makes it possible to generate pressure in the mass container that brings about, or at least assists, the metering into the metering chamber by reducing the volume of the mass container.

The flowing-through direction of the at least one metering chamber outlet valve preferably extends from the metering chamber volume to the atmosphere surrounding the casting machine and the flowing-through direction of the metering chamber inlet valve preferably extends from the mass container volume to the metering chamber volume. This allows a negative pressure to be generated in the metering chamber by increasing the metering chamber volume, with the result that the metering chamber outlet valve remains closed and the metering chamber inlet valve opens, whereby mass flows into the metering chamber until the pressure is equalized. By decreasing the metering chamber volume, a positive pressure can then be generated in the metering chamber, with the result that the metering chamber inlet valve closes and the metering chamber outlet valve opens, whereby mass flows out of the metering chamber until the pressure is equalized.

The metering chamber preferably has a plurality of metering chamber outlet valves and only one metering chamber inlet valve. Alternatively, the metering chamber may have a plurality of metering chamber outlet valves and a plurality of metering chamber inlet valves.

In particular, the number of metering chamber outlet valves and the number of metering chamber inlet valves of a metering chamber may be the same, each metering chamber outlet valve being expediently assigned one metering chamber inlet valve.

In the case of a particularly advantageous embodiment, the casting machine or its pressure generating means has a plurality of metering chambers, each metering chamber preferably having one metering chamber outlet valve and one metering chamber inlet valve. This allows a multiplicity of metering chambers to be arranged such that they are connected in parallel in the casting machine, whereby a high throughput can be achieved. The respective chamber volumes of each of the metering chambers are preferably coupled with one another.

Further advantages, features and application possibilities of the invention are provided by the description which now follows of exemplary embodiments of the casting machine, a pressure generating means and a valve on the basis of the drawing, in which.

Figure 1:
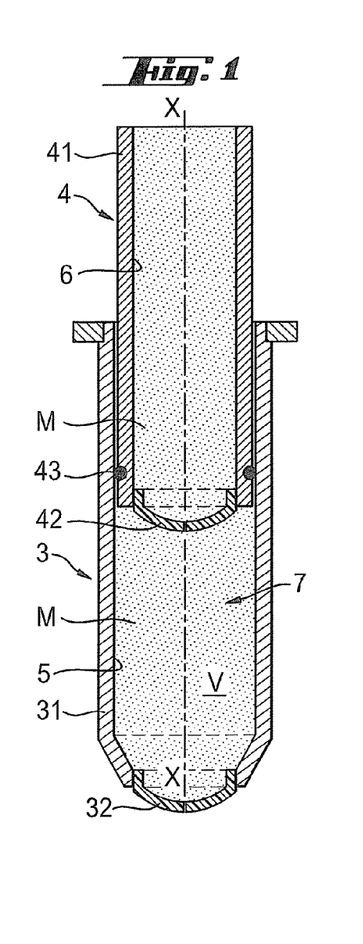
FIG. 1 shows an embodiment of a metering unit of the pressure generating means according to the invention in a first operating phase.

On the basis of FIG. 1, a description is now given of the structure of a metering valve 3, 4, which has a lower valve block 3 and an upper valve block 4. The metering unit 3, 4 is an essential component part of the pressure generating means according to the invention.

The lower valve block 3 contains a multiplicity of lower valve channels 5, which are arranged next to one another and parallel to one another and the cross section of which is preferably circular.

Each of the lower valve channels 5 is delimited by a channel wall 31, which is preferably cylindrical. At the lower end of a lower valve channel 5 there is a lower valve 32, and at the upper end of a lower valve channel 5 there is an upper valve 42. The channel wall 31, the lower valve 32 and the upper valve 42 define a metering chamber 7, the volume V of which is variable and is formed by a variable portion of the lower valve channel 5.

The upper valve block 4 likewise contains a multiplicity of upper valve channels 6, which are arranged next to one another and parallel to one another and the cross section of which corresponds to the cross section of the lower valve channels 5, therefore is preferably likewise circular. Each of the lower valve channels 6 is delimited by a channel wall 41, which is preferably cylindrical. At the lower end of an upper valve channel 6 there is an upper valve 42, and at the upper end each upper valve channel 6 is connected to the mass container 2 (see FIG. 8).

The channel wall 31, the lower valve 32 and the upper valve 42 determine the metering chamber 7 with its volume V. The inner cross section of a lower valve channel 5 corresponds to the outer cross section of an upper valve channel 6. Each lower valve channel 6 is displaceable inside a lower valve channel 5 along the common axis X of the channels 5 and 6. This relative movement of the channel wall 41 in relation to the channel wall 31 allows the volume V of the metering chamber 7 determined essentially by the channel wall 31, the lower valve 32 and the upper valve 42 to be changed. An annular seal 43, which is mounted as a sealing ring 43 in an annular groove in the outer face of the channel wall 41, provides sealing of the metering chamber 7 and prevents castable mass from being able to spread between the channel wall 31 and the channel wall 41 and emerge uncontrolled from the metering chamber 7. The annular seal may also be formed as an annular bead (not represented) in one piece with the channel wall. Optionally, a plurality of axially spaced-apart sealing rings 43 or annular beads (not represented) may also be provided on the channel wall 41.

The lower valve 32 is formed from an elastic material. When there is a sufficiently small pressure difference between the metering chamber 7 and the surroundings (atmosphere) at the lower valve 32, i.e. when a minimum valve pressure difference is not exceeded, the elastic material of the valve remains essentially undeformed, and the lower valve 32 remains closed. Only when the minimum valve pressure difference is exceeded does the lower valve 32 open.

A similar situation applies to the upper valve 42. The upper valve 42 is likewise formed from an elastic material. When there is a sufficiently low pressure difference between the valve channel 6 and the metering chamber 5 at the upper valve 42, i.e. when a minimum valve pressure difference is not exceeded, the elastic material of the valve remains essentially undeformed, and the upper valve 42 remains closed. Only when the minimum valve pressure difference is exceeded does the upper valve 42 open.

The operating mode of the metering unit 3, 4 as a component part of the pressure generating means according to the invention is now described on the basis of FIGS. 1, 2, 3, 4, 5 and 6.

FIG. 1 shows the first phase of a casting cycle of the metering unit 3, 4. The upper valve block 4 or each of the upper valve channels 6 has been drawn out from the lower valve block 3 or from the respective lower valve channel 5 along the axis X as fas as corresponds to the required metering volume. The upper valve block 4 is at the end of the intake stroke and is at rest with respect to the lower valve block 3. The volume V of the metering chamber 7 assumes its maximum value. Each upper valve channel 6 and each lower valve channel 5 is filled with castable mass M, which is sufficiently viscous that it comes to rest almost immediately after the intake. This is at the same time the beginning of the discharge stroke. The lower valve 32 and the upper valve 42 are closed. The mass M is at rest.

Figure 2:
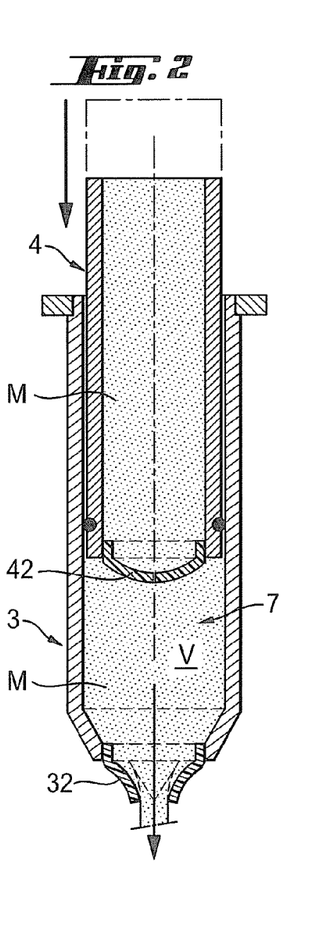
FIG. 2 shows the metering unit in a second operating phase.

FIG. 2 shows the second phase of the casting cycle. The valve block 4 or each of the upper valve channels 6 is pushed into the lower valve block 3 or into the respective lower valve channel 5 along the axis X. The upper valve 42 is closed, and the lower valve 32 is open. The mass M in the metering chamber 7 is discharged from the reducing volume V of the metering chamber through the lower valve 32. The upper valve block 4 is at a point within the discharge stroke and is moving with respect to the lower valve block 3. Each upper valve channel 6 and each lower valve channel is filled with mass M, which moves during the discharge stroke.

Figure 3:
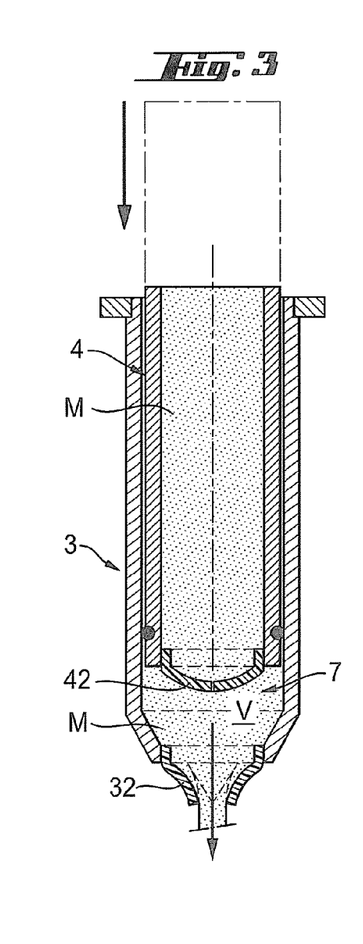
FIG. 3 shows the metering unit in a third operating phase.

FIG. 3 shows the third phase of the casting cycle. The upper valve block 4 or each of the upper valve channels 6 has been pushed into the lower valve block 3 or into the respective lower valve channel 5 along the axis X almost as far as corresponds to the required metering volume. The upper valve 42 is closed, and the lower valve 32 is still open. The mass M in the metering chamber 7 continues to be discharged through the lower valve 32. The upper valve block 4 is just before the end of the discharge stroke and is still moving with respect to the lower valve block 3. The volume V of the metering chamber 7 has almost reached its minimum value. Each upper valve channel 6 and each lower valve channel 5 is filled with mass M.

Figure 4:
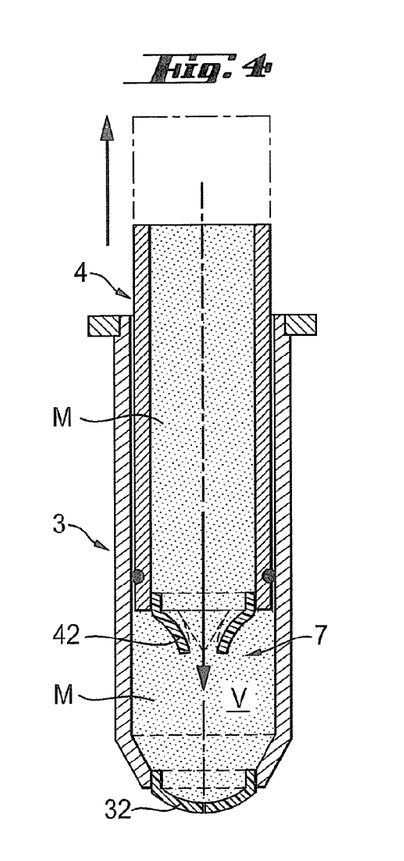
FIG. 4 shows the metering unit in a fourth operating phase.

FIG. 4 shows the fourth phase of the casting cycle. The upper valve block 4 or each of the upper valve channels 6 is drawn out from the lower valve block 3 or from the respective lower valve channel 5 along the axis X. The upper valve 42 is open, and the lower valve 32 is closed. The mass M is sucked through the upper valve 42 into the increasing volume V of the metering chamber 7. The upper valve block 4 is at a point within the intake stroke and is moving with respect to the lower valve block 3. The volume V of the metering chamber 7 is increasing. Each upper valve channel 6 and each lower valve channel 5 is filled with mass M, which moves during the intake stroke.

Figure 5:
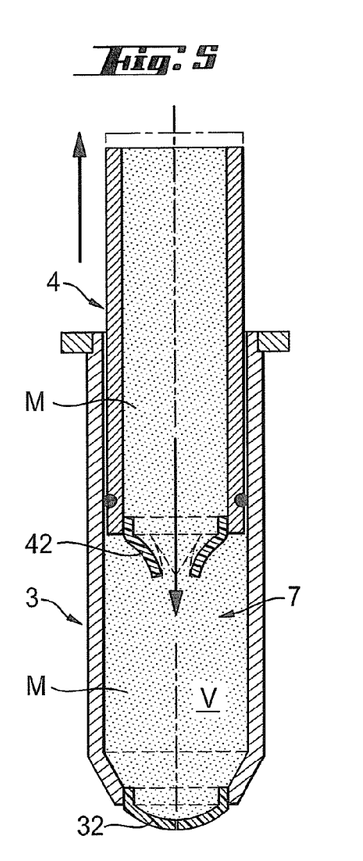
FIG. 5 shows the metering unit in a fifth operating phase.

FIG. 5 shows the fifth phase of the casting cycle. The upper valve block 4 or each of the upper valve channels 6 has been drawn out from the lower valve block 3 or from the respective lower valve channel 5 along the axis X almost as far as corresponds to the required metering volume. The upper valve 42 is still open, and the lower valve 32 is still closed. The mass M continues to be sucked through the upper valve 42 into the increasing volume V of the metering chamber 7. The upper valve block 4 is just before the end of the intake stroke and is still moving with respect to the lower valve block 3. The volume V of the metering chamber 7 has almost reached its maximum value. Each upper valve channel 6 and each lower valve channel 5 is filled with mass M.

Figure 6:
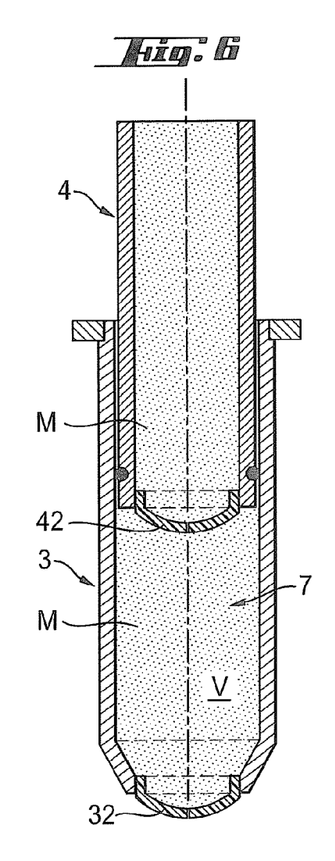
FIG. 6 shows the metering unit in a sixth operating phase.

FIG. 6 shows the sixth phase of the casting cycle of the metering unit 3, 4. The upper valve block 4 or each of the upper valve channels 6 has been drawn out from the lower valve block 3 or from the respective lower valve channel 5 along the axis X as far as corresponds to the required metering volume. The upper valve block 4 is at the end of the intake stroke and is at rest with respect to the lower valve block 3. The volume V of the metering chamber 7 resumes its maximum value. Each upper valve channel 6 and each lower valve channel 5 is filled with mass M. This is at the same time the beginning of the discharge stroke (see FIG. 1). The lower valve 32 and the upper valve 42 are closed. The mass M is at rest.

The pressure conditions during the operation of the metering unit 3, 4 as a component part of the pressure generating means according to the invention are now described on the basis of FIGS. 7A, 7B, 7C and 7D.

Figure 7A:
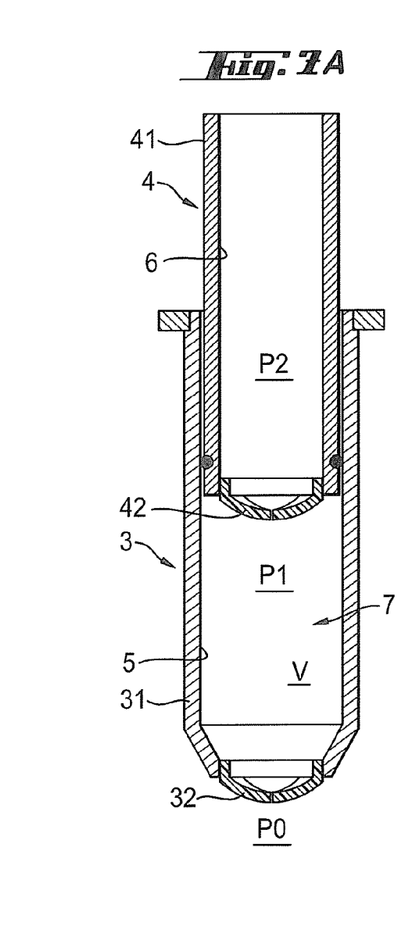
FIG. 7 shows on the basis of the metering unit the pressure conditions during the operation of the metering unit.

FIG. 7A shows the pressure conditions at the end of the intake stroke or at the beginning of the discharge stroke. The upper valve block 4 is at rest with respect to the lower valve block 3. The mass M is likewise at rest. The pressure P1 in the metering chamber 7 formed by the lower valve channel 5 is the same as the pressure P2 in the upper valve channel 6 (P1=P2). On account of the hydrostatic pressure, it may happen that the absolute values of the pressures P1 and P2 are somewhat higher than the atmospheric pressure P0. However, this pressure difference P1−P0=P2−P0 is less than the minimum valve pressure difference (opening pressure).

Figure 7B:
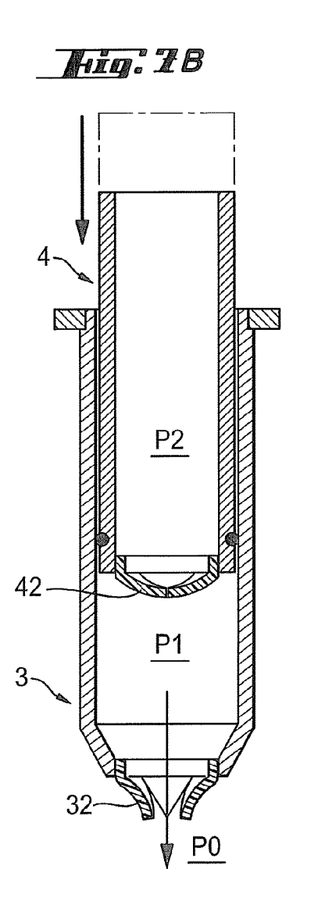

FIG. 7B shows the pressure conditions during the discharge stroke. The upper valve block 4 moves downward with respect to the lower valve block 3. The pressure P1 in the metering chamber 7 formed by the lower valve channel 5 is greater than the pressure P2 in the upper valve channel 6 (P1>P2). The upper valve 42 is closed. Furthermore, the pressure P1 in the metering chamber 7 is greater than the atmospheric pressure P0. The lower valve 32 is open.

Figure 7C:
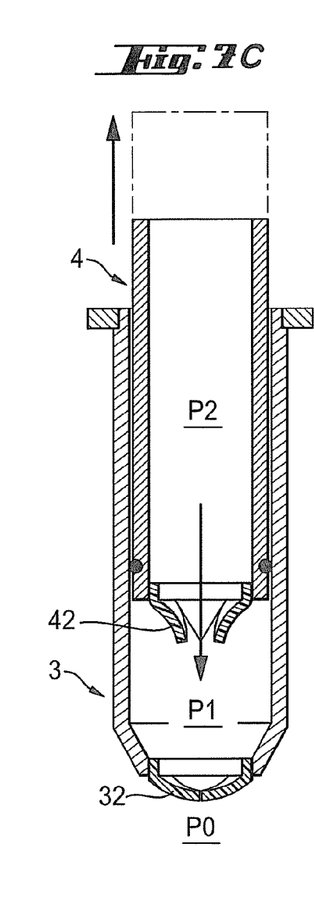

FIG. 7C shows the pressure conditions during the intake stroke. The upper valve block 4 moves upward with respect to the lower valve block 3. The pressure P1 in the metering chamber 7 formed by the lower valve channel 5 is less than the pressure P2 in the upper valve channel 6 (P1<P2). The upper valve is open. Furthermore, the pressure P1 in the metering chamber 7 is less than the atmospheric pressure P0. The lower valve 32 is closed.

Figure 7D:
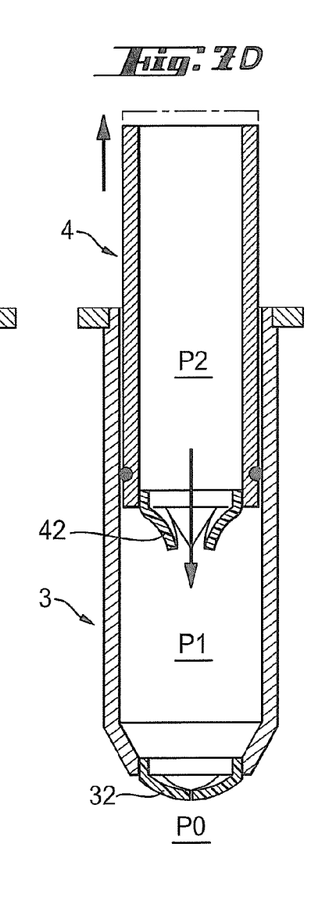

FIG. 7D shows the pressure conditions toward the end of the intake stroke. The upper valve block 4 is still moving with respect to the lower valve block 3. The pressure P1 in the metering chamber 7 formed by the lower valve channel 5 is still less than the pressure P2 in the upper valve channel 6 (P1<P2). The upper valve 42 is still open. Furthermore, the pressure P1 in the metering chamber 7 is less than the atmospheric pressure P0. The lower valve 32 is still closed.

Figure 8:
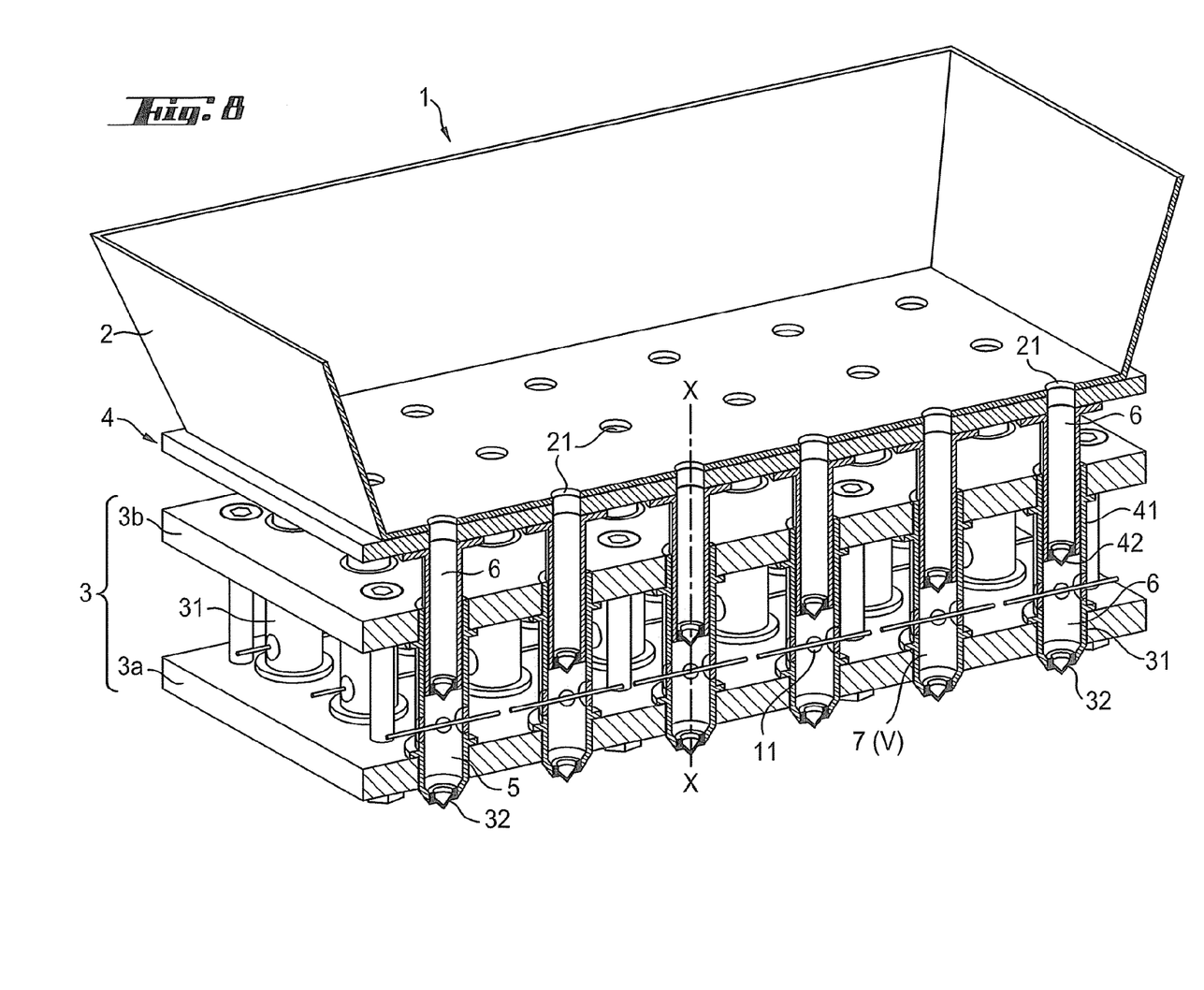
FIG. 8 shows a perspective view of a casting machine according to the invention shown in section along a vertical plane, the metering unit described in FIGS. 1 to 7 forming part of the pressure generating means or the casting machine.

FIG. 8 is a perspective view of a casting machine 1 shown in section along a vertical plane, the metering unit 3, 4 described in FIGS. 1 to 7 forming part of the casting machine 1. Arranged from top to bottom, the casting machine 1 contains essentially three elements, to be specific a mass container 2, an upper valve block 4 with upper valves 42 and a lower valve block 3 with lower valves 32.

The upper valve block 4 is formed here as a plate and is connected on its upper side to the mass container 2 and on its underside to a multiplicity of cylindrical upper valve channels 6, which each extend normal to the planar underside of the upper valve block 4 and are each formed by a cylindrical channel wall 41. At the lower end, they each have an upper valve 42. The base of the mass container 2 contains a multiplicity of holes 21, each of which opens out into one of the upper valve channels 6.

The lower valve block 3 is formed here by a lower plate 3a and an upper plate 3b, which are aligned parallel to the upper valve block 4 and the base of the mass container 2. The two plates 3a and 3b have a multiplicity of holes, at which they are connected via a multiplicity of cylindrical lower valve channels 5, which extend from the location of one of the holes in the plates 3a and 3b in the manner of webs between the lower plate 3a and the upper plate 3b and are each formed by a cylindrical channel wall 31. The lower valve block 3 is consequently composed of a rigid unit which is formed by the lower plate 3a, the upper plate 3b and the multiplicity of web-like lower valve channels 5. At its lower end, each lower valve channel 5 has a lower valve 32.

The lower valve block 3 and the upper valve block 4 are mounted such that they slide on one another. The sliding mounting is in this case formed by the multiplicity of cylindrical channel walls 41 of the upper valve channels 6 and the multiplicity of cylindrical channel walls 31 of the lower valve channels 5, the outer wall of a respective valve channel wall 41 lying against the inner wall of the respective valve channel wall 31 and the concentric cylinder channel walls 31, 41 being able to slide in relation to one another along the respective cylinder axis X. This linear relative movement between the lower valve block 3 and the upper valve block 4 has the effect of changing the volume V of the metering chambers 7 essentially determined by the valve channel wall 31 as well as by the lower valve 32 and the upper valve 42, as can also be seen from the cycle of FIGS. 1, 2, 3, 4, 5 and 6. For the pressure conditions in the lower valve channel 5 or within a metering chamber 7 determined by it and in the upper valve chamber 6, the same applies as stated with respect to FIGS. 7A, 7B, 7C and 7D.

For the essential functioning of the casting machine 1, it is insignificant whether, during a casting cycle, the lower valve block 3 is moved and the upper valve block 4 is at rest or, conversely, whether both are moved simultaneously or one after the other in relation to one another.

In each of the metering chambers 7 there is a vibrating element 11, via which vibrations can be introduced into the mass to be cast. The vibrating elements 11 have the form of small rods which extend transversely through each metering chamber 7 or each lower valve channel 5 and are mounted in the valve channel wall 31.

Figure 9:
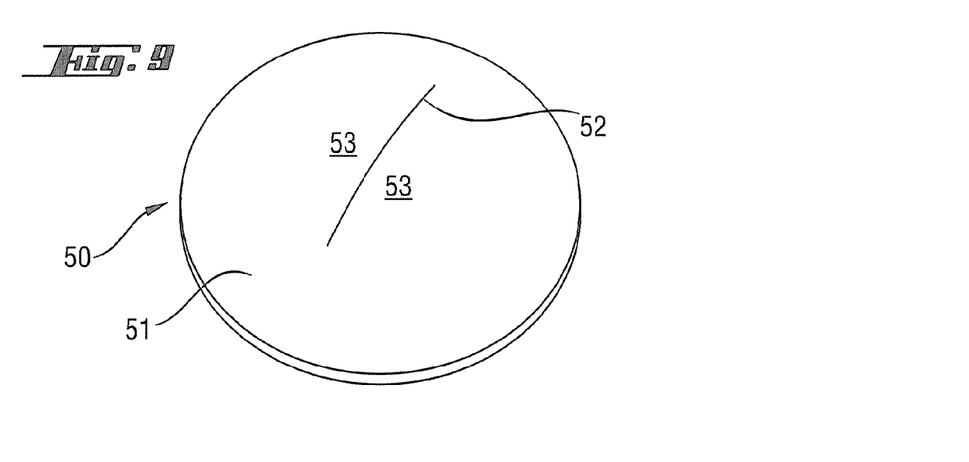
FIG. 9 shows a perspective view of an embodiment of the valve according to the invention.

FIG. 9 shows a perspective view of a valve 50 according to the invention. The valve 50 has a two-dimensional main body 51 of an elastic material, in particular of elastomer material, with a circular outline, seen along the valve axis or the flowing-through direction of the valve. The main body 51 is convexly curved in the flowing-through direction of the valve and is penetrated by a slit 52, extending through the center point of the surface area of the valve 50. As a result, an approximately halfmoon-shaped valve flap 53 is defined on each of both sides of the slit 52.

The valve 50 shown perspectively in FIG. 9 corresponds to the valves 32 and 42 shown in section in FIGS. 1 to 6.

Figure 10:
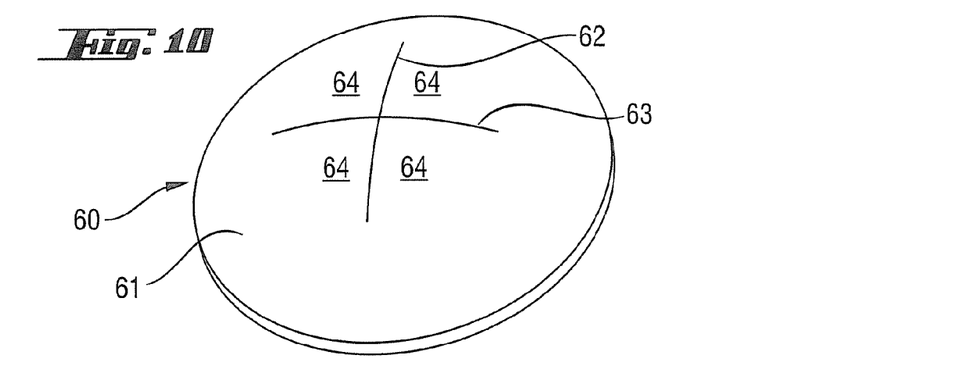
FIG. 10 shows a perspective view of a further embodiment of the valve according to the invention.

FIG. 10 shows a perspective view of a further valve 60 according to the invention. The valve 60 has a two-dimensional main body 61 of an elastic material, in particular of elastomer material, with a circular outline, seen along the valve axis or the flowing-through direction of the valve. The main body 61 is convexly curved in the flowing-through direction of the valve and is penetrated by a first slit 62, extending through the center point of the surface area of the valve 60, and a second slit 63, crossing the first slit at the center point of the surface area. The crossing slits 62 and 63 define a total of four flaps 64, which approximately have the form of a right-angled triangle.

The valve 60 shown perspectively in FIG. 10 also corresponds to the valves 32 and 42 shown in section in FIGS. 1 to 6.

Figure 11:
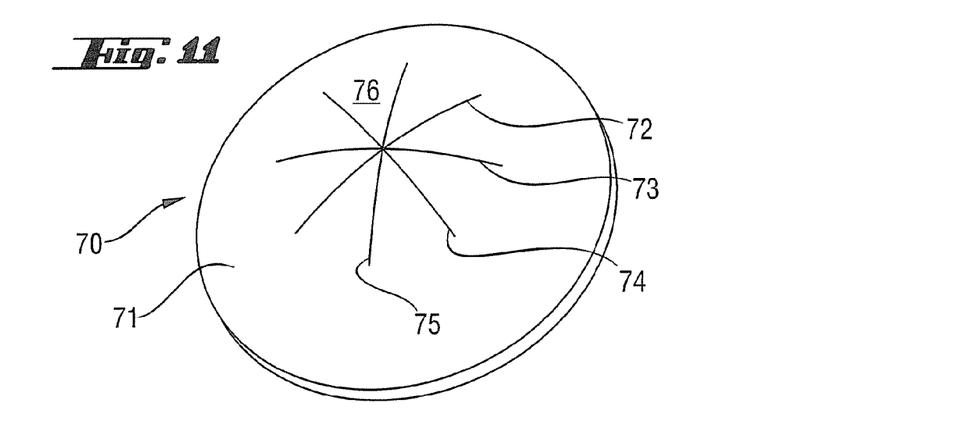
FIG. 11 shows a perspective view of a further embodiment of the valve according to the invention.

FIG. 11 shows a perspective view of a further valve 70 according to the invention. The valve 70 has a two-dimensional main body 71 of an elastic material, in particular of elastomer material, with a circular outline, seen along the valve axis or the flowing-through direction of the valve. The main body 71 is convexly curved in the flowing-through direction of the valve and is penetrated by four slits 72, 73, 74, 75, extending through the center point of the surface area of the valve 70 and crossing there. The crossing slits 72, 73, 74, 75 define a total of eight valve flaps 76, which approximately have the form of an acute-angled triangle.

Instead of the "straight" slits of the valves 50, 60 or 70 (see FIGS. 9, 10, 11), which only have the curvature of the two-dimensional main body 51, 61, 71, the slits of the valves 50, 60, 70 may also have an additional curvature within the two-dimensional main body 51, 61, 71. Advantageous are S-shaped slits (not shown), which are arranged in the main body 51, 61, 71 point-symmetrically in relation to the center point of the surface area (point of intersection of the valve axis and the two-dimensional main body).

Figure 12:
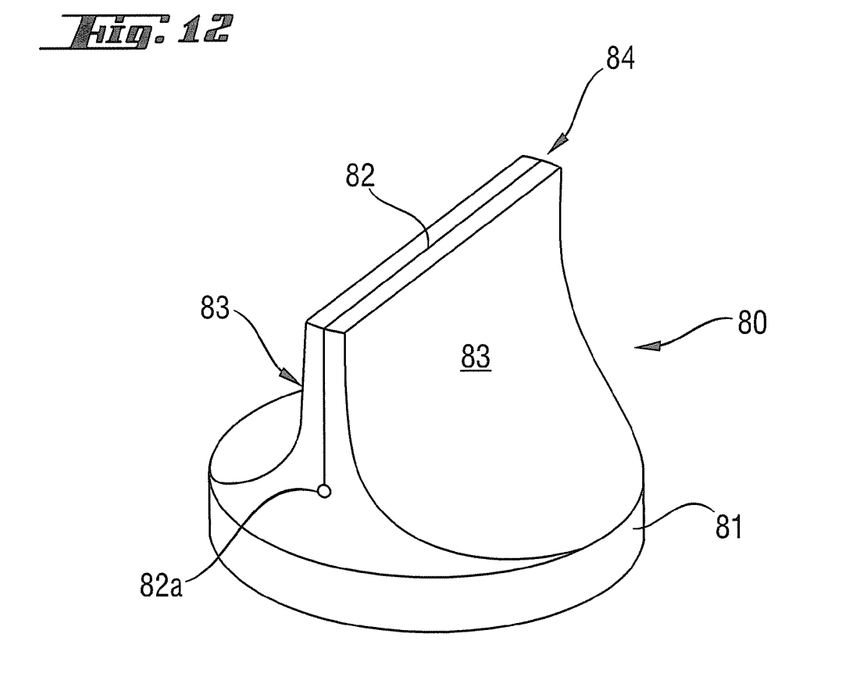
FIG. 12 shows a perspective view of a further embodiment of the valve according to the invention.

FIG. 12 shows a perspective view of a valve 80 according to the invention. The valve 80 has a main body 81 of an elastic material, in particular of elastomer material, with a circular outline, seen along the valve axis or the flowing-through direction of the valve. Protruding from the main body 81 in the flowing-through direction of the valve are two concavely curved valve flaps 83, which lie with their ends against one another along a transversely extending slit 82 and consequently form a slit ridge 84.

At the end 82a of the slit 82 toward the edges there are accumulations of material; a hole with an approximately circular cross section is provided, extending along the notch-like end 82a through the membrane-like material of the valve 80 and consequently removing the notch-like character (from the end of the slit 82a), with the result that crack propagation in the membrane material of the valve 80 caused by notch stresses is prevented.

Figure 13:
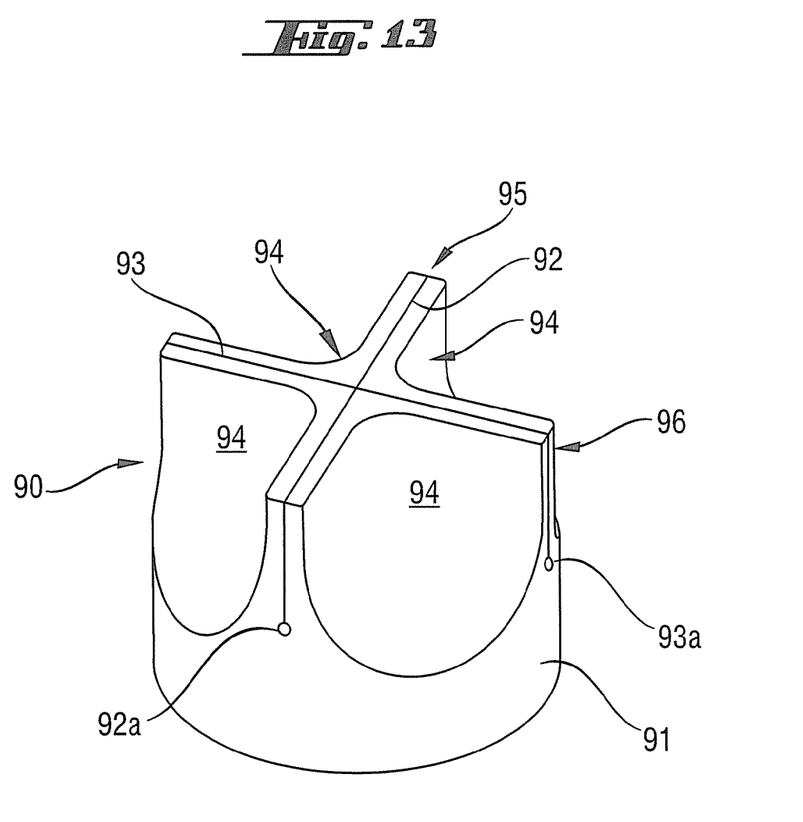
FIG. 13 shows a perspective view of a further embodiment of the valve according to the invention.

FIG. 13 shows a perspective view of a valve 90 according to the invention. The valve 90 has a main body 91 of an elastic material, in particular of elastomer material, with a circular outline, seen along the valve axis or the flowing-through direction of the valve. Protruding from the main body 91 in the flowing-through direction of the valve are four concavely curved valve flaps 94, which lie with their ends against one another along two slits 92, 93 extending transversely and crossing one another at right angles, and consequently form two slit ridges 95, 96, which likewise cross one another at right angles.

At the end 92a, 93a of the slits 92, 93 toward the edges there are accumulations of material provided to prevent crack formation starting from the ends of the slits 92a, 93a toward the edges. Instead of the accumulations of material or in combination with such accumulations of material, holes with an approximately circular cross section may be provided at the ends of the slits 92a, 93a toward the edges, extending along the notch-like ends of the slits 92a, 93a through the membrane-like material of the valve 90 and consequently removing the notch-like character (from the ends of the slits 92a, 93a), with the result that crack propagation in the membrane material of the valve 90 caused by notch stresses is prevented.

Figure 14A:
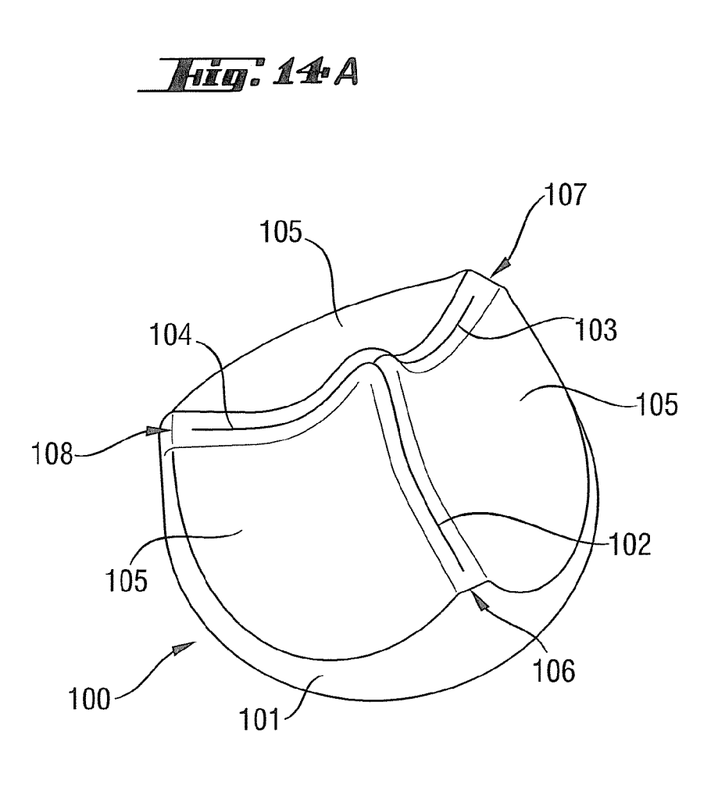
FIG. 14A shows a further embodiment of the valve according to the invention, seen essentially opposite to the flowing-through direction of the valve.
Figure 14B:
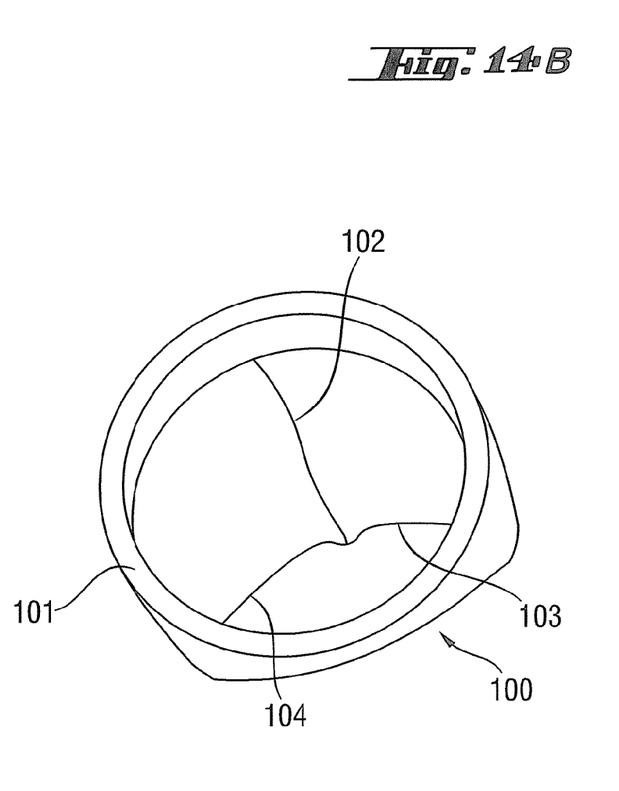
FIG. 14B shows the embodiment of the valve according to the invention as shown in FIG. 14A, seen essentially in the flowing-through direction of the valve.

FIG. 14A and FIG. 14B show a perspective view of a valve 100 according to the invention, FIG. 14A being a view of the valve 100 seen essentially opposite to the flowing-through direction of the valve and FIG. 14B being a view of the valve 100 seen essentially in the flowing-through direction of the valve. The valve 100 has a main body 101 of an elastic material, in particular of elastomer material, with a circular outline, seen along the valve axis or the flowing-through direction of the valve. Protruding from the main body 101 in the flowing-through direction of the valve are three concavely curved valve flaps 105, which lie with their ends against one another along three slits 102, 103, 104 arranged in a star-like manner, converge at the center of the valve and consequently form three slit ridges 106, 107, 108, which are likewise arranged in a star-like manner and converge at the center of the valve. The upper edge of the respective ridges 106, 107, 108 has a concave profile between the center of the valve and the edge of the valve. At the center of the valve, the converging upper edges of the ridges 106, 107, 108 protrude furthest upward from the base of the valve (imaginary plane that is defined by the lower edge of the main body 101 of the valve).

Figure 15A:
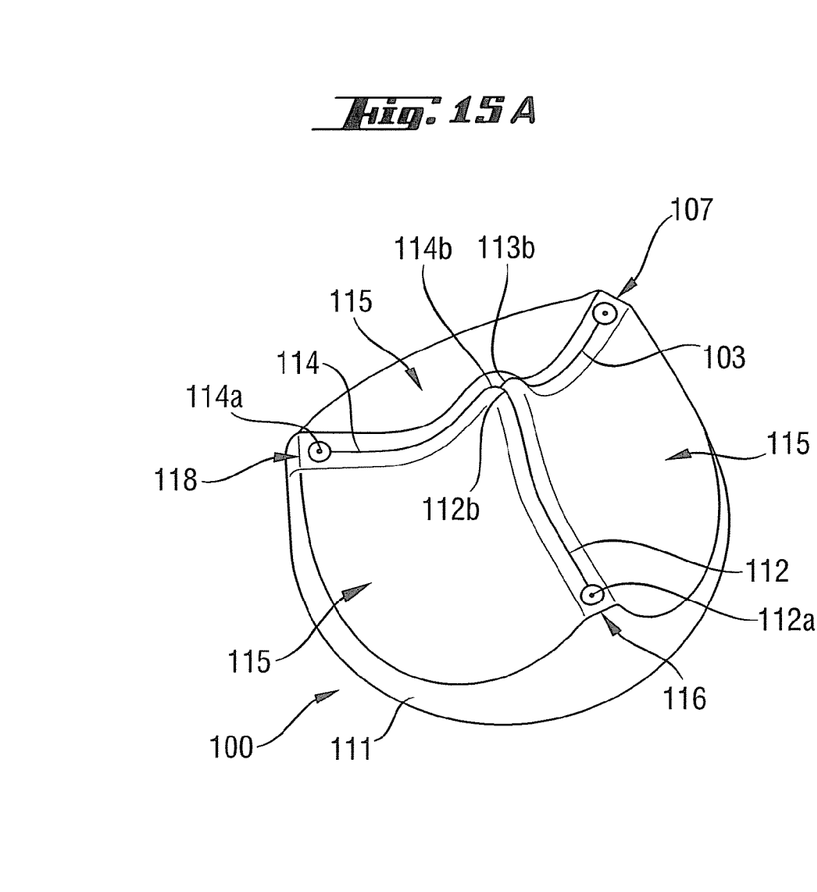
FIG. 15A shows a further embodiment of the valve according to the invention, seen essentially opposite to the flowing-through direction of the valve.
Figure 15B:
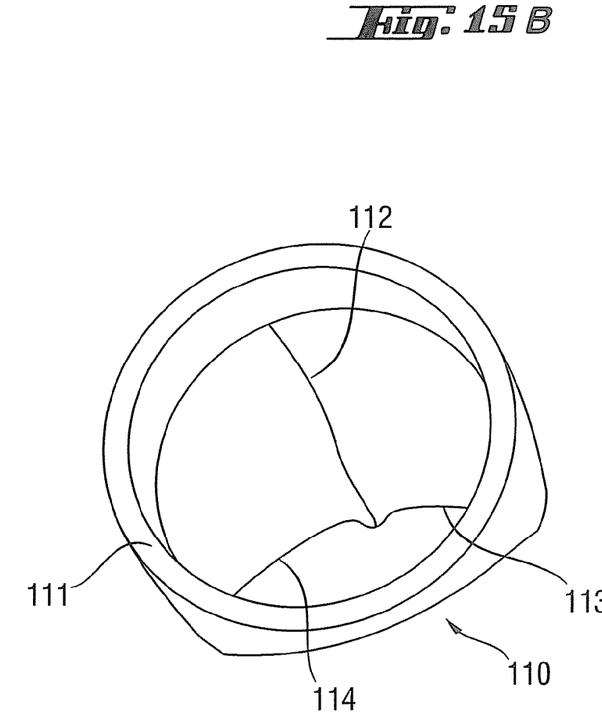
FIG. 15B shows the embodiment of the valve according to the invention as shown in FIG. 15A, seen essentially in the flowing-through direction of the valve.

FIG. 15A and FIG. 15B show a perspective view of a valve 110 according to the invention, FIG. 15A being a view of the valve 110 seen essentially opposite to the flowing-through direction of the valve and FIG. 15B being a view of the valve 110 seen essentially in the flowing-through direction of the valve. The valve 110 has a main body 111 of an elastic material, in particular of elastomer material, with a circular outline, seen along the valve axis or the flowing-through direction of the valve. Protruding from the main body 111 in the flowing-through direction of the valve are three concavely curved valve flaps 115, which lie with their ends against one another along three slits 112, 113, 114 arranged in a star-like manner, converge with their central ends 112b, 113b, 114b at the center of the valve and consequently form three slit ridges 116, 117, 118, which are likewise arranged in a star-like manner and converge at the center of the valve. The upper edge of the respective ridges 116, 117, 118 has a concave profile between the center of the valve and the edge of the valve. At the center of the valve, the converging upper edges of the ridges 116, 117, 118 protrude furthest upward from the base of the valve (imaginary plane that is defined by the lower edge of the main body 111 of the valve).

At the end 112a, 113a, 114a of the slits 112, 113, 114 toward the edges there are accumulations of material provided to prevent crack formation starting from the ends of the slits 112a, 113a, 114a toward the edges. Instead of the accumulations of material or in combination with such accumulations of material, holes with an approximately circular cross section may be provided at the ends of the slits 112a, 113a, 114a toward the edges, extending along the notch-like ends of the slits 112a, 113a, 114a through the membrane-like material of the valve 110 and consequently giving the ends of the slits 112a, 113a, 114a their notch-like character, with the result that crack propagation in the membrane material of the valve 110 caused by notch stresses is prevented. The valve 110 is made to resemble a heart valve.

Figure 16:
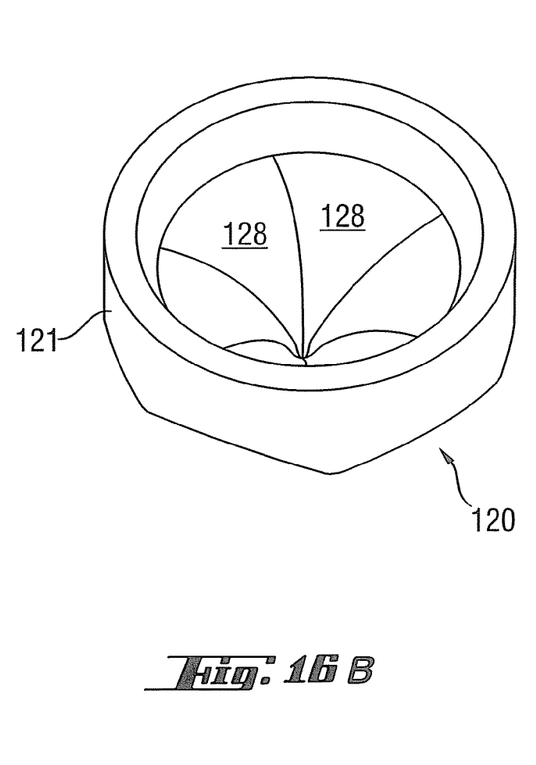
FIG. 16A shows a further embodiment of the valve according to the invention, seen essentially opposite to the flowing-through direction of the valve.
FIG. 16B shows the embodiment of the valve according to the invention as shown in FIG. 16A, seen essentially in the flowing-through direction of the valve.

FIG. 16A and FIG. 16B show a perspective view of a valve 120 according to the invention, FIG. 16A being a view of the valve 120 seen essentially opposite to the flowing-through direction of the valve and FIG. 16B being a view of the valve 120 seen essentially in the flowing-through direction of the valve. The valve 120 has a main body 121 of an elastic material, in particular of elastomer material, with a circular outline, seen along the valve axis or the flowing-through direction of the valve. Protruding from the main body 121 in the flowing-through direction of the valve are six concavely curved valve flaps 128, which lie with their ends against one another along six slits 122, 123, 124, 125, 126, 127 arranged in a star-like manner, converge with their central ends at the center of the valve and consequently form six slit ridges 129, 130, 131, 132, 133, 134, which are likewise arranged in a star-like manner and converge at the center of the valve. The upper edge of the respective ridges 129, 130, 131, 132, 133, 134 has a concave profile between the center of the valve and the edge of the valve. At the center of the valve, the converging upper edges of the ridges 129, 130, 131, 132, 133, 134 protrude furthest upward from the base of the valve (imaginary plane that is defined by the lower edge of the main body 121 of the valve).

At the end 122a, 123a, 124a, 125a, 126a, 127a of the slits 122, 123, 124, 125, 126 127 toward the edges there are accumulations of material provided to prevent crack formation starting from the ends of the slits 122a, 123a, 124a, 125a, 126a, 127a toward the edges. Instead of the accumulations of material or in combination with accumulations of material, holes with an approximately circular cross section may be provided at the ends of the slits 122a, 123a, 124a, 125a, 126a, 127a toward the edges, extending along the notch-like ends of the slits 122a, 123a, 124a, 125a, 126a, 127a through the membrane-like material of the valve 120 and consequently removing the notch-like character (from the ends of the slits 122a, 123a, 124a, 125a, 126a, 127a), with the result that crack propagation in the membrane material of the valve 120 caused by notch stresses is prevented. The valve 120 resembles a circus tent with a tarpaulin lying on hanging-down beams, which is poorly tensioned and consequently sagging.

Onto each of the valves 90, 100, 110 or 120 (see FIGS. 13, 14, 15, 16) there may be pushed a rigid stabilizing ring or clamping ring (not shown), the inside diameter of which is less than the outside diameter of a valve 90, 100, 110 or 120 without clamping and by which the valve 90, 100, 110 or 120 is compressed in the radial direction. The term "rigid" should be understood here in the sense that the flexibility of the stabilizing or clamping ring is much less than that of the valve. This gives the valve 90, 100, 110 or 120 prestressing, which brings about the effect of pressing these valve flaps against one another in the slits on account of the concavity of the valve flaps. This stabilizing ring, extending around the valve 90, 100, 110 or 120 in the circumferential direction, extends at least over a partial portion of the axial length of the valve 90, 100, 110 or 120.

It is particularly advantageous if this stabilizing ring is displaceable along the valve 90, 100, 110 or 120, along the axial direction. In the case of the valve 90, 100, 110 or 120 with concave valve flaps, a displacement of the stabilizing ring or clamping ring along the axial direction brings about a change in the prestressing in the valve material, and consequently a change in the pressing force of the valve flaps pressed against one another, and consequently ultimately a change in the closing force of the valve 90, 100, 110 or 120. An axial displacement of the stabilizing ring in the flowing-through direction of the valve then brings about an increase in the closing force. An axial displacement of the stabilizing ring opposite to the flowing-through direction of the valve thereby brings about a reduction in the closing force.

The valves 50, 60, 70, 80, 90, 100, 110, 120 described and shown here preferably consist of an elastomer material. For stabilizing or stiffening, stiffening ribs or stiffening meshes may be provided on the surfaces or inside the valve material. In particular, woven fabric inserts may be used to prevent crack propagation or crack formation. Local valve stiffening is also possible by a locally different thickness of the two-dimensional valve material, to be precise preferably in the form of surface ribs of valve material. The valves may be produced in one piece and also provided with an inherent material stress ("frozen-in" state of stress). Such inherent material stresses and/or a special valve form in which deformation, and in particular eversion, of the valve takes place along the plane of the two-dimensional main body of the valve, while overcoming a compression of the valve, allow the valves according to the invention to be provided with pressure points.

The invention claimed is:

1. A casting machine for casting a flowable mass, comprising:
   a mass container for receiving the flowable mass;
   at least one valve which is fluidically connected to the interior space of the mass container, the valve being in an open state in the presence of a pressure gradient along the flowing-through direction of said valve and in a closed state in the absence of this pressure gradient along the flowing-through direction of said valve; and
   a pressure generating means for generating a pressure gradient along the flowing-through direction of the valve; wherein
   the valve has a valve body with a valve opening and at least one valve flap assigned to the valve opening, which flap is articulated on the valve body and is subjected to an elastic prestressing which presses the valve flap against the valve opening and seals it;
   the pressure generating means is a metering chamber with variable chamber volume and with at least one metering chamber outlet valve and one metering chamber inlet valve, the metering chamber inlet valve being arranged in the fluidic connection between the mass container volume and the metering chamber volume; and
   a base of the mass container contains a multiplicity of holes, each of which opening out into one of upper valve channels.

2. A casting machine as claimed in claim 1, wherein the valve flap is flexible.

3. A casting machine as claimed in claim 1, wherein the valve flap consists of elastomer material which lies against the valve opening in the prestressed state.

4. A casting machine as claimed in claim 1, wherein the valve has at least two valve flaps assigned to the valve opening, which valve flaps are articulated on the valve body and are each subjected to an elastic prestressing which presses the valve flaps against one another and seals the valve opening.

5. A casting machine as claimed in claim 4, wherein the flap edge of the at least one valve flap of the valve, projected perpendicularly to the flowing-through direction of the valve onto a valve cross-sectional plane, extends from a first radially outer point of the valve cross-sectional plane over a radially central point of the valve cross-sectional plane to a second radially outer point of the valve cross-sectional plane.

6. A casting machine as claimed in claim 1, wherein the valve has at least three valve flaps assigned to the valve opening, which valve flaps are articulated on the valve body in a peripheral region and are each subjected to an elastic prestressing which presses the valve flaps against one another and seals the valve opening, the valve having a pyramidal shape which is elevated in the direction of the flowing-through direction of the valve and the pyramidal faces of which are respectively formed by a valve flap, whereby, between two respective pyramidal faces adjacent to one another a valve slit respectively extends from a radially outer point to the radial center.

7. A casting machine as claimed in claim 6, wherein the valve has three, four, five or six valve flaps and has a respectively three-, four-, five- or six-faced pyramidal shape.

8. A casting machine as claimed in claim 6, wherein the pyramidal faces, seen from the tip of the pyramid, are each concavely shaped and formed by a respective concavely shaped valve flap, the concavity of which extends between the delimiting valve slits of the flap and the peripheral articulating region.

9. A casting machine as claimed in claim 6, wherein the pyramidal faces, seen from the tip of the pyramid, are each convexly shaped and formed by a respective convexly shaped valve flap, the convexity of which extends between the delimiting valve slits of the flap and the peripheral articulating region.

10. A casting machine as claimed in claim 1, wherein the valve body and the at least one valve flap are formed in one piece.

11. A casting machine as claimed in claim 10, wherein the valve body and the at least one valve flap of the valve are formed as an elastomer molding.

12. A casting machine as claimed in claim 10, wherein the valve body and the at least one valve flap of the valve are connected to one another.

13. A casting machine as claimed in claim 11, wherein the valve is coupled with a stabilizing element or stiffening element.

14. A casting machine as claimed in claim 13, wherein the valve body and/or the at least one valve flap is coupled with a stabilizing element or stiffening element.

15. A casting machine as claimed in claim 13, wherein the stabilizing element or stiffening element consists of a first material and the valve or the valve body and/or the at least one valve consists of a second material, the modulus of elasticity of the first material being greater than the modulus of elasticity of the second material.

16. A casting machine as claimed in claim 10, wherein the valve body is arranged in a valve seat which surrounds it in the manner of an annulus or a ring and consists of the second material.

17. A casting machine as claimed in claim 1, wherein, on account of the deformation of the valve, during the transition from the closed state to the open state of the valve or during the transition from the open state to the closed state of the valve, the at least one valve passes through a pressure point at which the potential energy stored in the valve is at a maximum.

18. A casting machine as claimed in claim 17, wherein the deformation of the valve is an eversion of a valve flap from a concave form of the valve flap to a convex form of the valve flap or from a convex form of the valve flap to a concave form of the valve flap.

19. A casting machine for casting a flowable mass, comprising:
   a mass container for receiving the flowable mass;
   at least one valve which is fluidically connected to the interior space of the mass container, the valve being in an open state in the presence of a pressure gradient along the flowing-through direction of said valve and in a closed state in the absence of this pressure gradient along the flowing-through direction of said valve; and
   a pressure generating means for generating a pressure gradient along the flowing-through direction of the valve; wherein
   the valve has a valve body with a valve opening and at least one valve flap assigned to the valve opening, which flap is articulated on the valve body and is subjected to an elastic prestressing which presses the valve flap against the valve opening and seals it;
   the pressure generating means is a metering chamber with variable chamber volume and with at least one metering chamber outlet valve and one metering chamber inlet valve, the metering chamber inlet valve being arranged in the fluidic connection between the mass container volume and the metering chamber volume; and
   the casting machine comprises a plurality of metering chambers arranged such that they are connected in parallel in the casting machine.

\* \* \* \* \*